United States Patent
Kurian et al.

(10) Patent No.: US 10,949,417 B2
(45) Date of Patent: Mar. 16, 2021

(54) BLOCKCHAIN AUGMENTED INTERNET OF THINGS ("IOT") DEVICE-BASED SYSTEM FOR DYNAMIC SUPPLY CHAIN TRACKING

(71) Applicant: Bank of America Corporation, Charlotte, NC (US)

(72) Inventors: Manu Kurian, Dallas, TX (US); Matthew E. Carroll, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 158 days.

(21) Appl. No.: 16/199,403

(22) Filed: Nov. 26, 2018

(65) Prior Publication Data

US 2020/0167337 A1    May 28, 2020

(51) Int. Cl.
*G06F 17/00* (2019.01)
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
CPC .. G06F 16/2379; G06F 16/27; G06F 16/9024; G06F 16/9027; G06Q 10/08
See application file for complete search history.

(56) References Cited

U.S. PATENT DOCUMENTS

| | | | |
|---|---|---|---|
| 9,292,832 B2 | 3/2016 | Goel et al. | |
| 9,413,827 B2 | 8/2016 | Sharma et al. | |
| 9,438,440 B2 | 9/2016 | Burns et al. | |
| 9,680,726 B2 | 6/2017 | Sharma et al. | |
| 9,699,659 B2 | 7/2017 | Zehavi et al. | |
| 9,853,826 B2 | 12/2017 | Shuman et al. | |
| 9,875,510 B1 | 1/2018 | Kasper | |
| 9,900,171 B2 | 2/2018 | Guedalia et al. | |
| 10,015,293 B2 | 7/2018 | Seed et al. | |
| 10,051,068 B2 | 8/2018 | Sharma et al. | |
| 10,251,053 B1 | 4/2019 | Paczkowski | |
| 2016/0253622 A1* | 9/2016 | Sriram | H04L 63/126 713/179 |
| 2016/0259937 A1 | 9/2016 | Ford et al. | |
| 2016/0260095 A1 | 9/2016 | Ford | |
| 2016/0337127 A1 | 11/2016 | Schultz et al. | |
| 2017/0345019 A1 | 11/2017 | Radocchia et al. | |

(Continued)

FOREIGN PATENT DOCUMENTS

WO    WO2018/125989    7/2018

*Primary Examiner* — Greta L Robinson
(74) *Attorney, Agent, or Firm* — Weiss & Arons LLP; Michael A. Springs, Esq.

(57) ABSTRACT

Systems and methods for dynamic supply chain product tracking are provided. The method may include embedding IoT devices across a multi-stage supply chain. The method may include computing, via the IoT devices, a value impact of each stage of the multi-stage supply chain process. The method may also include transmitting, via the IoT devices, each value impact of a stage to blockchain database host systems. The method may also include constructing, via each of the blockchain database host systems, a new linked data block for each value impact of a stage. The method may also include computing a real value of the end product based on the linked data blocks in the blockchain database host systems.

19 Claims, 8 Drawing Sheets

(56) References Cited

U.S. PATENT DOCUMENTS

| | | | |
|---|---|---|---|
| 2018/0096175 A1* | 4/2018 | Schmeling | B29C 64/10 |
| 2018/0108024 A1* | 4/2018 | Greco | H04L 9/3236 |
| 2018/0137457 A1 | 5/2018 | Sachs et al. | |
| 2018/0183587 A1* | 6/2018 | Won | H04L 9/3247 |
| 2018/0253451 A1 | 9/2018 | Callan et al. | |
| 2018/0330349 A1* | 11/2018 | Uhr | G06Q 20/3827 |
| 2019/0147174 A1* | 5/2019 | Narasimhan | G06Q 10/0833 |
| | | | 726/29 |
| 2019/0149558 A1* | 5/2019 | Phan | H04W 12/0023 |
| | | | 713/164 |
| 2019/0172566 A1 | 6/2019 | Schulman et al. | |
| 2019/0289454 A1 | 9/2019 | Inoue | |
| 2019/0349190 A1 | 11/2019 | Smith et al. | |
| 2020/0142965 A1* | 5/2020 | Weldemariam | G06F 16/2379 |
| 2020/0175623 A1* | 6/2020 | Howie | G06Q 20/389 |

\* cited by examiner

BLOCKCHAIN AUGMENTED INTERNET OF THINGS ("IOT") DEVICE-BASED SYSTEM FOR DYNAMIC SUPPLY CHAIN TRACKING

FIELD OF TECHNOLOGY

Aspects of the disclosure relate to Internet of Things ("IoT") devices. Specifically, aspects of the disclosure relate to networks of IoT devices augmented with blockchain technology.

BACKGROUND OF THE DISCLOSURE

A supply chain may be used to manufacture components and form unit assemblies. Examples of unit assemblies include a finished unit processed from a single component, or a combination of multiple components connected or affixed into a larger unit. At the end of a supply chain, a unit assembly, referred to herein, in the alternative, simply as a unit, represents a final product.

For example, a driver's-side airbag is a unit assembly of components which themselves are assemblies of other, more basic subcomponents. The airbag assembly is itself a unit which might be part of a larger unit assembly such as a car.

A complete supply chain—i.e., source and manufacturing—lifecycle for assembling a final product typically begins with raw material. The raw material may be sourced, purchased, or created by a first entity. As the raw material travels down the supply chain, it undergoes physical and transactional transformations. For example, the raw material may be sold to a second entity, which may proceed to mold the raw material into a subcomponent. The second entity may sell the subcomponent to a third entity, which may build the subcomponent into a larger component. Building the subcomponent into a larger component may be a part of a larger process—at the third entity—to manufacture a final product.

In another example, a single entity may oversee the entire supply chain lifecycle. In yet another example, the raw material may be processed individually throughout a supply chain lifecycle, without joining other subcomponents.

It is often desirable for a manufacturer of a final product to understand and monitor the source of, and the process undergone by, all components (and subcomponents) included in a particular unit assembly. Variations in the source and process can have significant impact on the aggregate end value of a product. For example, a car built by a car manufacturer may have a range of actual costs depending on the which sources were used for particular raw materials, components, and subcomponents. The unique supply chain experience of an individual car may also affect the value of the car. For example, if a component was found to be faulty and required replacement, or a mishap on the assembly line caused a delay in the manufacturing process, that individual car may be associated with a higher production cost.

Safety and quality may be a concern as well. For example, it may be important to understand the source of components and the specific processes used to construct a particular driver's-side airbag, a particular jet engine, or a particular medical implant. Understanding the source and process may be crucial to obtaining an accurate safety and/or quality rating for a specific product.

This is difficult, in practice, because each particular product may have a long and complex supply chain history. The history may include multiple entities, such as sources and/or suppliers. Each entity may have their own historical records, or may not maintain records at all. Furthermore, the history may contain many phases of a supply chain process, each phase contributing to the final, actual product. Each phase may be associated with a variable cost.

The Internet of Things ("IoT") is a distributed network of devices, including small and micro devices, that are connected—directly or indirectly—to the internet. A blockchain is a distributed ledger of records which contain information.

It would be desirable to provide systems and methods for providing IoT device-based supply chain valuation. It would be further desirable to augment management of the system with blockchain technology.

SUMMARY OF THE DISCLOSURE

Aspects of the disclosure relate to smart supply chains. The smart supply chain ("SSC") may include a plurality of stages. Each stage may be configured to execute one step of a multi-step process. The multi-step process may be for producing an end product from one or more sub-products.

The SSC may include a plurality of IoT devices. Each one of the IoT devices may either be associated with a stage or coupled to a product. A product may be the end product or one of the sub-products.

The SSC may include a blockchain database. The blockchain database may include a plurality of coordinated databases. Each coordinated database may be stored on a distinct node from a plurality of nodes. Each coordinated database may include linked blocks of hashed data. A block that is linked to a previous block may include a hashing of the hashed data of the previous block.

The IoT devices of the SSC may compute a record for each step of the multi-step process. The record may include data that includes a step identifier ("ID") and a calculation of a value impact of the step. The data may be added to the blockchain database. The end product may be associated with a real value that is based on the data in the blockchain database.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
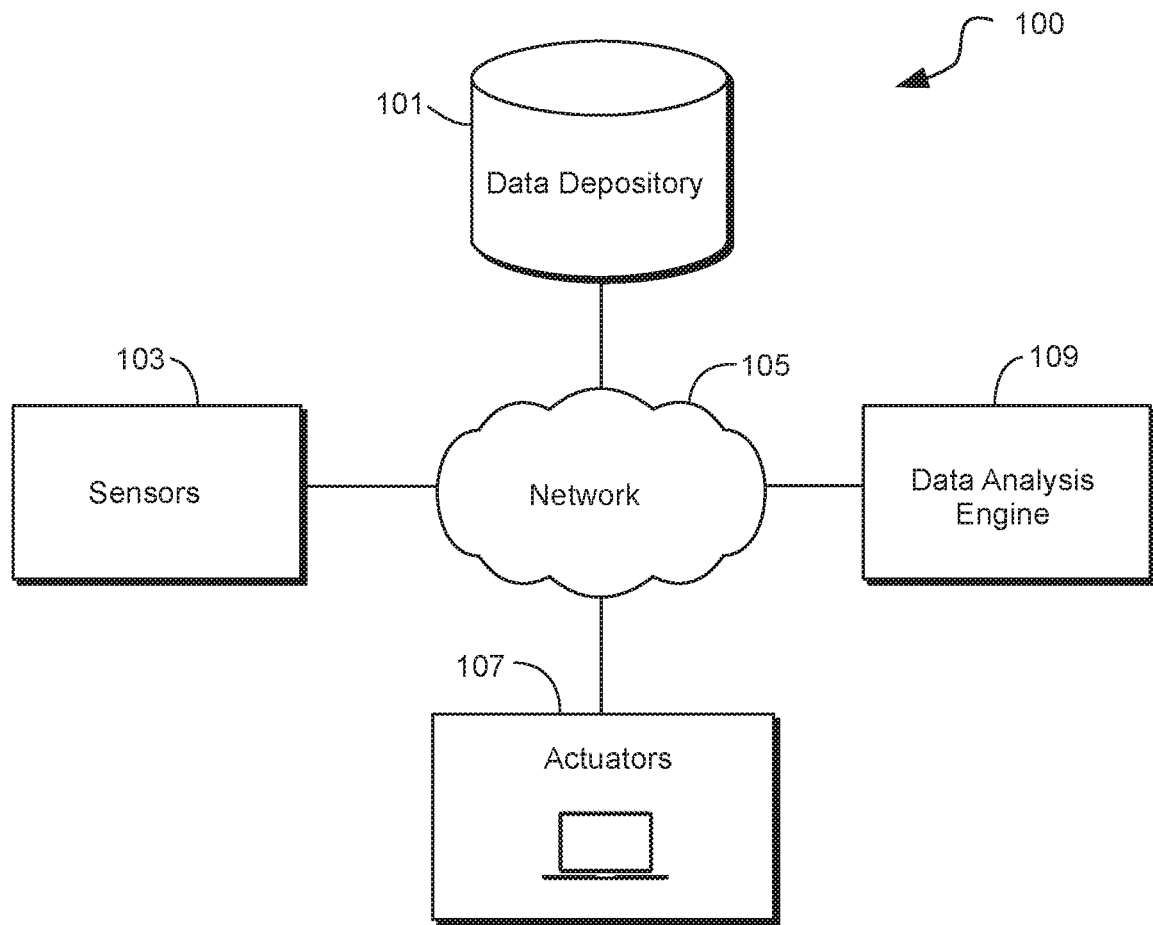
FIG. 1 shows an illustrative system in accordance with principles of the disclosure.

Aspects of the disclosure relate to smart supply chains. The smart supply chain ("SSC") may include a plurality of stages. Each stage may be configured to execute one step of a multi-step process. The multi-step process may be for producing an end product from one or more sub-products.

The SSC may include a plurality of IoT devices. Each one of the IoT devices may be associated with a stage or coupled to a product (i.e., the end product or one of the sub-products).

An IoT device associated with a stage may include physical proximity to a stage, e.g., a device with a sensor that is near a machine on an assembly line. It may also include virtual association, e.g., a device that tracks purchase costs of a set of components. An IoT device coupled to a product may include any suitable means for attaching any suitable device to the product. In one illustrative example, the IoT device may be a small unit with basic memory, processing, and/or transmitting/receiving functionality. The small device may include an adhesive for affixing to the product. In one example, the small unit may be microscopic.

The SSC may include a blockchain database. The blockchain database may include a plurality of coordinated (i.e., synced via consensus) databases. Each coordinated database may be stored on a distinct node from a plurality of nodes. Each coordinated database may include linked blocks of hashed data. A block that is linked to a previous block may include a hashing of the hashed data of the previous block. In certain embodiments, the data may be encrypted. In other embodiments, the data may not be hashed or encrypted.

The IoT devices of the SSC may compute a record for each step of the multi-step process. The record may include data that includes a step identifier ("ID"), a calculation of a value impact of the step, and/or any other suitable information. The data may be added to the blockchain database. The end product may be associated with a real value that is based on the data in the blockchain database.

In some embodiments of the SSC, the value impact of a step may include a sum of the values of a plurality of sub-products that are merged at the step. For example, when a seatback and lower-seat are merged in an automotive supply chain, the value of the seatback (contained in an IoT device coupled to the seatback) may be summed with the value of the lower-seat (contained in an IoT device coupled to the lower-seat) to give a value of the merged chair. The value impact may include an increase in value due to an improvement executed on a product at the step. For example, if a cost was expended to merge the seatback and lower-seat, the value impact of the merged chair may be a sum of the values of the seatback and lower-seat plus the cost of merging. The value impact may include a decrease in value due to an occurrence at the step. For example, if a component got damaged at a step, the value of the component may decrease. In this example, the value may reflect an intrinsic value as opposed to a cost to the manufacturer.

In certain embodiments of the SSC, when an IoT device records a step, the IoT device may add the data of the step to the blockchain database. Adding the data may include transmitting the data to the plurality of nodes. Each node may hash the data. The hashed data may be stored as a new linked block.

The nodes of the SSC may comprise the IoT devices. The nodes may comprise computer systems of one or more preauthorized entities. Entities may include suppliers, manufacturers, distributers, retailers, regulatory agencies, or any other suitable entity. In some embodiments, a consortium of entities may form to host the blockchain.

A system for dynamic valuation of a unit is provided. The unit may be manufactured via a multi-stage supply chain process. The unit may include one or more subunits. At least one of the subunits may be a foundational subunit. A foundational subunit may be a subunit at its first step in the process, e.g., a subunit after its initial acquiring, sourcing, or fabrication.

The system may include one or more Internet of Things ("IoT") devices. Each of the subunits, as well as the unit, may be coupled to its own distinct IoT device. Each IoT device may include a non-transitory computer memory for storing a registry of data relating to a cost and/or a quality of the unit or subunit to which it is coupled. The registry of the IoT device that is coupled to a foundational subunit may be initialized with a running cost and/or a quality rating for said foundational subunit.

When a subunit is processed at a stage of the multi-stage supply chain process, the registry of the attached IoT device may be updated to reflect a change, caused by the processing at the stage, in the running cost and/or the quality rating for the subunit.

When two or more subunits are merged into a merged component (the merged component being either another subunit or the unit) at a stage of the multi-stage supply chain process, the registry of the IoT device coupled to the merged component may be updated. Updating the registry may include initializing the registry. Updating the registry may include setting a running cost and/or the quality rating that is based at least in part on a combination of the running costs and/or the quality ratings of the two or more subunits.

Updating the registry may also include deactivating the IoT devices coupled to the two or more subunits. In some embodiments, deactivating the IoT devices may include setting a deactivated flag for each of said IoT devices.

When the supply chain process is complete, the registry of the IoT device coupled to the unit may be updated with a running cost and/or a quality rating. The update may be based on a predetermined function. The function may include summing all the running costs and/or the quality ratings of every subcomponent and stage of processing that were included in the multi-stage supply chain process.

In some embodiments of the system, each of the IoT devices may include a radio frequency identifier ("RFID") tag. Each of the IoT devices may be configured to adhere to the unit or one of the subunits.

In certain embodiments, each IoT device may further include a receiver for receiving data and a transmitter for transmitting data. The IoT devices may be configured to transmit and receive with one or more of the following communication protocols: Bluetooth; IEEE 802.11 standard ("Wi-Fi"); Light Fidelity ("Li-Fi"); IEEE 802.15.4 standard ("ZigBee"); and cellular.

In some embodiments of the system, the initialized running cost for a foundational subunit may be based on a cost of obtaining the foundational subunit. Obtaining may include purchasing, sourcing, or creating.

The initialized quality rating for a foundational subunit may be based on a predetermined mapping of quality ratings to a list of possible sources of a foundational subunit. For example, a set sources may be rated on a suitable scale. The scale may be 0 or 1 to 5, 10, or 100. The rating may be the result of audit, manufacturer experience, customer feedback, research, and/or any other suitable mechanism for rating the quality of a supplier.

In certain embodiments, updating the running cost when two or more subunits are merged may include summing the running costs of the two or more subunits. A cost of the merging may be added to the sum. Updating the quality rating when two or more subunits are merged may include taking the minimum of the quality ratings of the two or more subunits. In other embodiments, updating the quality rating may include taking an average of the quality ratings of the two or more subunits.

In some embodiments of the system, the IoT devices may be configured to communicate with each other. The updating the running cost and/or the quality rating when two or more subunits are merged into a merged component at a stage of the multi-stage supply chain process may include a sub-process. In the sub-process, the IoT device that is coupled to the merged component may communicate with the IoT devices of the two or more subunits to receive the data stored in the IoT devices of the two or more subunits.

Updating the running cost when a subunit is processed at a stage may, in certain embodiments, include receiving cost data from one or more sensors. The sensors may be located proximal to the stage. The cost data may include a real-time cost associated with the stage. The cost data may be added to the running cost.

Updating the quality rating when a subunit is processed at a stage may, in some embodiments, include receiving quality data from one or more sensors located proximal to the stage. The quality data may include a real-time quality impact associated with the stage. The quality data may be added to the quality rating. Adding the quality data may include taking a minimum. Adding the quality data may include taking an average.

Some embodiments of the system may include a distributed ledger for data management. The distributed ledger may include a set of databases. Each of the databases may include a set of linked data blocks. Each data block may include hashed data. A data block that is linked to a previous data block may include a hashing of hashed data of the previous data block. In other embodiments, the link may be a pointer, and may not involve hashing.

Each one of the databases of the distributed ledger may be stored on a distinct one of a plurality of nodes. When a running cost and/or quality rating of an IoT device is initialized/updated, a data block containing data associated with the initialization/update may be created on each of the nodes. The data block may be linked to the most recent pre-update data block.

In some embodiments, when a running cost and/or quality rating of an IoT device is initialized or updated, and a data block is created on each of the nodes, the IoT device may transmit a signal to the nodes to trigger the creation of the data block.

In certain embodiments, the system may further include a network of hub devices. Each hub device may be positioned proximal to a stage of the multi-stage supply chain process. Each hub device may include an IoT reader. When an IoT device is updated at a stage, the hub device at the stage may read the data of the update from the IoT device. The hub device may also transmit the data of the update to the nodes for creating a new data block.

In some embodiments of the system, the nodes may include the IoT devices. The nodes may also include computer systems of one or more preauthorized entities. Entities may include suppliers, manufacturers, distributers, retailers, and regulatory agencies.

A method for dynamic supply chain product valuation is provided. The method may include embedding each of a plurality of IoT devices across a multi-stage supply chain. The supply chain may be configured for producing an end product from one or more sub-products.

Embedding an IoT device may include associating an IoT device with a stage of the supply chain. Embedding may also include coupling an IoT device to a product. A product may be either the end product or one of the sub-products.

The method may include computing, via the IoT devices, a value impact of each stage of the multi-stage supply chain process.

The method may also include transmitting, via the IoT devices, each value impact of a stage to a plurality of blockchain database host systems.

The method may further include constructing, via each of the blockchain database host systems, a new linked data block for each value impact of a stage; and The method may also include computing a real value of the end product based on the linked data blocks in the blockchain database host systems.

In certain embodiments, the blockchain database host systems may include the IoT devices. The blockchain database host systems may also include computer systems of one or more preauthorized entities. Entities may include suppliers, manufacturers, distributers, retailers, and regulatory agencies.

Certain embodiments of the system may be configured to provide real-time valuation of components on the supply chain itself. For example, it may be important to track the lifecycle of a component on a supply chain, such a machining tool. A particular machining tool may be rated for, e.g., a million cycles. Tracking the actual lifecycle of the particular machining tool, may help a manufacturer replace the tool in a timely manner, contributing to the efficiency, quality, and safety of the manufacturing process.

Some embodiments of the system may include a distributed ledger (blockchain) of records which contain information about manufacturing units and unit assemblies (a combination of multiple units connected or affixed into a larger unit). At the end of a supply chain, a unit assembly may represent a final product.

For example, a driver's-side airbag is a unit assembly of units (subcomponents) which themselves are assemblies of other, more fundamental or basic units. The airbag assembly is itself a unit which might be part of a larger assembly such as a car.

It is often desirable to understand the source of all critical units that comprise a particular unit assembly. For example, for safety or quality reasons, it may be important to understand the source of components used to construct a particular driver's-side airbag, a particular jet engine, a particular medical implant, or a particular container of potato salad. Moreover, understanding the source of all critical units may be vital in computing a real value—or cost—associated with the unit.

One difficulty that presents in practice is that each manufacturer maintains its own records about the source of its critical subcomponents. Also, within each manufacturer there exist many stages of a supply chain process, and each stage may be associated with a variable real cost. Calculating a real value, or a safety/quality rating, might require piecing together a supply chain through many stages and/or multiple suppliers located in different parts of the world.

One embodiment of the system may operate by allowing authorized suppliers of critical components to record information about the component on the blockchain. The information may include cost and/or quality information. This may be done by allowing manufacturers with a private key to publish transactions through a wallet-like interface to the blockchain. The information may be tied to a specific unit, for example where the unit is identified by a serial number ("SN"). A serial number may be etched or printed onto the unit, or stored as an electronic SN in a read-only memory chip. Other means of identification such as specific sequences of nucleotides in a DNA or RNA fragment encapsulated into the device body (e.g., in micro or nanobeads), or radioactively-tagged molecules.

It is envisioned that where it is not practical to identify units with a serial number or other form of ID, the "handoff" of a unit (or batch of units) from a supplier-manufacturer to a receiver-manufacturer and incorporation of that unit into a unit assembly by the receiver-manufacturer can be "confirmed" by a transaction requiring agreement and joint-participation by the supplier and receiver, thereby shifting the responsibility for identifying the unit from the supplier-manufacturer to the receiving-manufacturer. This is only possible where the supplier-manufacturer is providing a single unit that is incorporated into a single unit-assembly which can be uniquely identified, or where the supplier-manufacturer is providing a batch of units (manufactured under identical conditions) which are incorporated into The significant information about the unit that is posted to the blockchain might include:

The ID of the unit (the identifier on the blockchain);

The serial number of the unit (or some other identifier which may apply to the discrete unit or at a batch level for multiple units fabricated together under identical conditions);

An ID of the stage of manufacture;

A value impact, safety impact, and/or quality impact of a stage of manufacture;

The date of manufacture (or stage of manufacture);

The location of manufacture (or stage of manufacture);

The ID of the manufacturer; and

The IDs of one or more subcomponent units.

Manufacturers may submit entries to the blockchain. In some embodiments, the blockchain would be maintained in a distributed manner by at least some of the participants on the blockchain, including perhaps government regulatory agencies, consumer protection groups, etc. The verification process may leverage proof-of-work or proof-of-stake, or some hybrid scheme which is trusted to result in trustless verification of the entry (or block of entries) submitted to the blockchain.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows illustrative system architecture 100. Architecture 100 may represent an internet of things ("IoT"). A differentiator between IoT and conventional networks is a traffic profile. In an IoT, nodes may not have defined or known network positions, communication protocols or security services. Solutions that allow architecture 100 to function seamlessly and leverage such disparate components are disclosed herein.

Architecture 100 may include nodes. Each node may include two or more nodes. FIG. 1 shows exemplary nodes 101, 103, 105, 107 and 109. Nodes 101, 103, 105, 107 and 109 may execute one or more of the functions of the IoT network described herein. The IoT network may include data depository 101, data analysis engine 109 and/or actuators 107. The IoT network may include any additional hardware such as receivers, transmitters, processors, databases, and any other suitable hardware.

The architecture includes sensors 103. A sensor 103 may be an IoT node that is a part of the IoT network disclosed herein. Sensors 103 may include devices that detect changes in a physical or virtual environment. For example, sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" two or more stimuli or environmental changes.

Sensors may implement two or more functions. For example, sensors may measure changes in their native environment, capture data related to the measured changes store and communicate the captured data. Sensors may be accessed by other sensors or any other node. Sensors may transmit captured data to another node. Sensors may broadcast captured data to two or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 101.

Sensors maybe positioned and capture data from diverse locations. Locations may be associated with stages of a supply chain. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 101.

Based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, sensors 103 may operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at predefined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships enables access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. For example, actuators 107 may move (translate, rotate, etc.) physical objects or activate/deactivate functionalities of more complex ones. An actuator may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as, for example, "eyes," collecting information about their environment. In contrast, actuators 107 act as "hands," implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 107.

In the absence of express relationships between sensors and the devices that access data captured by the sensors traditional approaches for managing trust, security naming, discovery, or other traditional network services may not be applicable or available. Apparatus and methods provided herein may provide enhanced maintenance and supervision of IoT systems.

Generally, nodes of architecture 100 may interact and cooperate using one or more interaction paradigms. Exemplary interaction paradigms include client-server and peer-to-peer interactions.

As a result of the disparate nature of sensors 103, an architecture, such as architecture 100 incorporating sensors 103 may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 mW for 1 mW transmission power over a range of 10 to 100 meters and a data transmission rate of 250 kbit/s.

To conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes. Such communication links may be wired or wireless. Exemplary wireless communication links may include Bluetooth, Wi-Fi, 3G, 4G, 5G and LTE.

Figure 2:
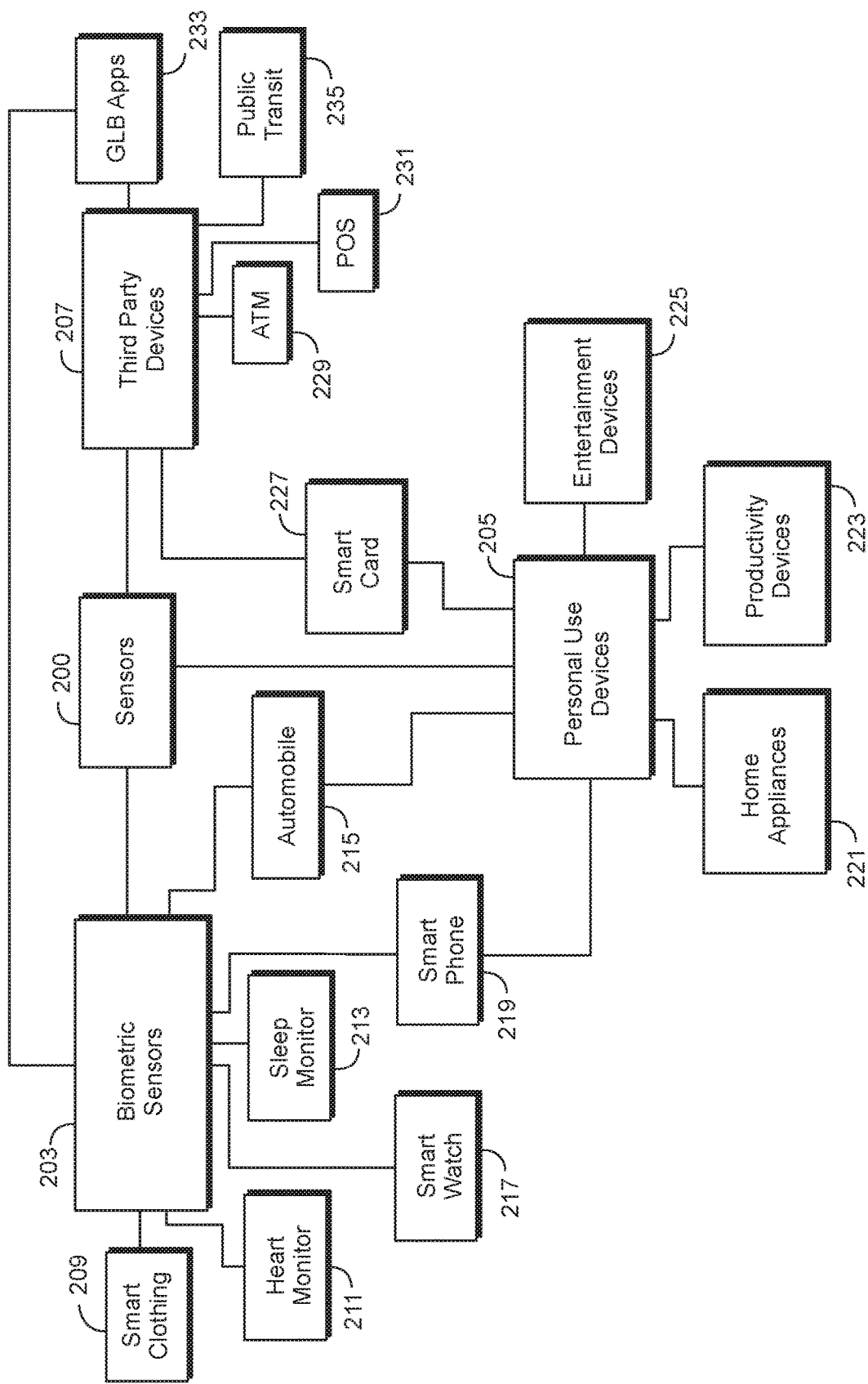
FIG. 2 shows another illustrative system in accordance with principles of the disclosure.

FIG. 2 shows an illustrative system with sensors 200. Sensors 200 may be IoT nodes. Sensors 200 may include one or more features of sensors 103 (shown in FIG. 1). Sensors 200 include biometric sensors 203 that sense biometric attributes. For example, biometric sensors may be embedded in "smart" clothing 209 that monitors a wearer's physical condition. Such clothing may capture biometric data, such as pulse rate, temperature, muscle contraction, heart rhythm and physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 219, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. A user may interact with third-party devices 207 to obtain a desired service provided by the third-party.

Exemplary third-party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 207 may include ATMs 229 and point-of-sale terminals ("POS") 231. Such devices may also be actuators.

Third-party devices may also include software applications 233. Applications 233 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 2 shows that sensors may categorically overlap. For example, an application used to access an online bank portal may capture a biometric feature (e.g., fingerprint) to authenticate a user.

Each of the sensors shown in FIG. 2 may include different and possibly incompatible hardware. For example, sensors may each have different operating systems (or none at all), processor types and memory. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 µW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication protocols or other suitable communication protocols.

Furthermore, because of potentially disparate features and characteristics of sensors 200, security solutions disclosed herein may be used to verify an authenticity of a sensor and/or data transmitted by the sensors.

Figure 3:
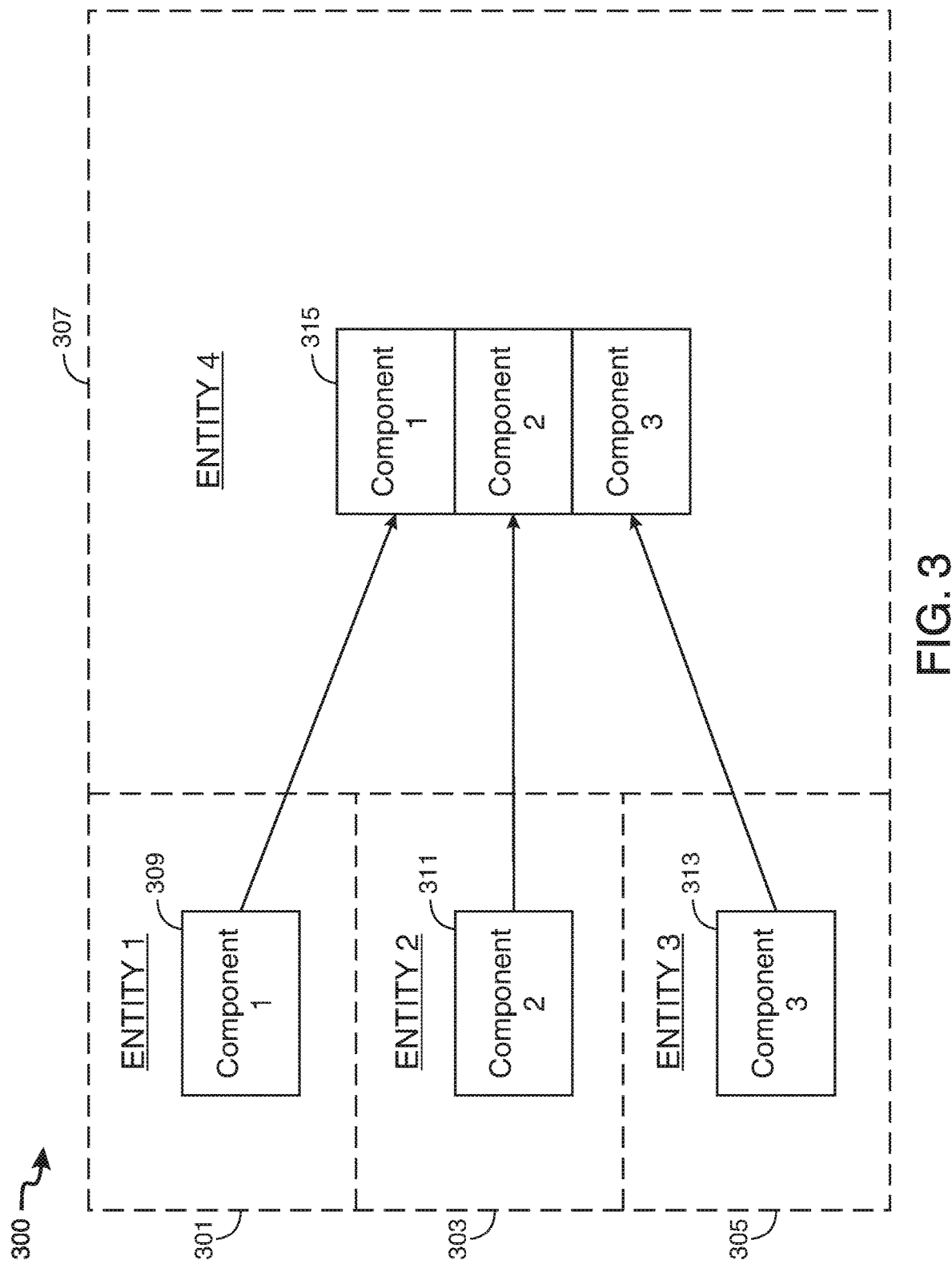
FIG. 3 shows yet another illustrative system in accordance with principles of the disclosure.

FIG. 3 shows illustrative system 300. System 300 may include a smart supply chain. The smart supply chain may include Entity 1, 301, Entity 2, 303, Entity 3, 305, and Entity 4, 307. An example of an entity may include a manufacturer or a supplier.

In one embodiment, Entity 4 (307) may procure Component 1 (309) from Entity 1 (301), Component 2 (311) from Entity 2 (303), and Component 3 (313) from Entity 3 (305). Each of Entities 1-3 (301-305) may have procured its respective component via sourcing, fabricating, purchasing, or any other suitable means for procuring a component. The procuring may be a one step process, or, alternatively, a multi-step process.

Entity 4 may manufacture an end product 315 from Components 1-3. Manufacturing end product 315 may include merging Components 1-3. The manufacturing may be a one step process, or, alternatively, a multi-step process.

In some embodiments of the system, the smart supply chain may include a plurality of IoT devices (not shown). The IoT devices may be attached to, or otherwise associated with, Components 1-3 and end product 315.

For example, a first IoT device may be attached to Component 1. Entity 4 (307) may attach the first IoT device upon procuring Component 1. The first IoT device may be initialized with a first cost, $C_1$. $C_1$ may be the cost of procuring Component 1. A second IoT device may be attached to Component 2. The second IoT device may be initialized with a second cost, $C_2$. $C_2$ may be the cost of procuring Component 2. A third IoT device may be attached to Component 3. The third IoT device may be initialized with a third cost, $C_3$. $C_3$ may be the cost of procuring Component 3.

Entity 4 (307) may merge Components 1-3 to form end product 315. The merging may be associated with a fourth cost, $C_4$. A fourth IoT device may be attached to end product 315. The fourth IoT device may contain a final cost, $C_f$. $C_f$ may be computed by summing $C_1$-$C_4$, to provide an actual, fact-based valuation of end product 315. In some embodiments, the fourth IoT device may compute $C_f$ directly. The direct computation may include receiving a transmission of cost data ($C_1$-$C_3$) from the first, second, and third IoT devices. In some embodiments, the first, second, and third IoT devices may be deactivated after transmitting the cost data, in effect being subsumed by the fourth—more cumulative—IoT device. The fourth IoT device may receive $C_4$ via sensors, another IoT device proximal to the merging, a computer system associated with Entity 4, or any other suitable source.

Entity 4 (307) may leverage $C_f$ to conduct fact-based, real-time, supply chain analytics. The supply chain analytics provided by the system may be used to find strengths and weaknesses within the supply chain. The supply chain analytics provided by the system may be used for dynamic pricing and cost sharing that reflect a real value of end product 315.

In some embodiments, the supply chain analytics provided by the system may be useful for custom builds. New or additional features and/or components can may be accurately tacked on the standard, real value price to give the user a clear and precise price point. Similarly, a buyer may leverage the system to choose to reject an option or limit additional features and/or components due to their budget or other factors. A manufacturer may also be able to give more accurate assessments of bulk orders to maximize profit while giving a fair market value.

In some embodiments, the first, second, and third IoT devices may be attached at and/or by Entities 1-3, respectively. In certain embodiments, the IoT devices may include safety and/or quality information to provide a real-time, fact-based, safety and/or quality rating.

Figure 4:
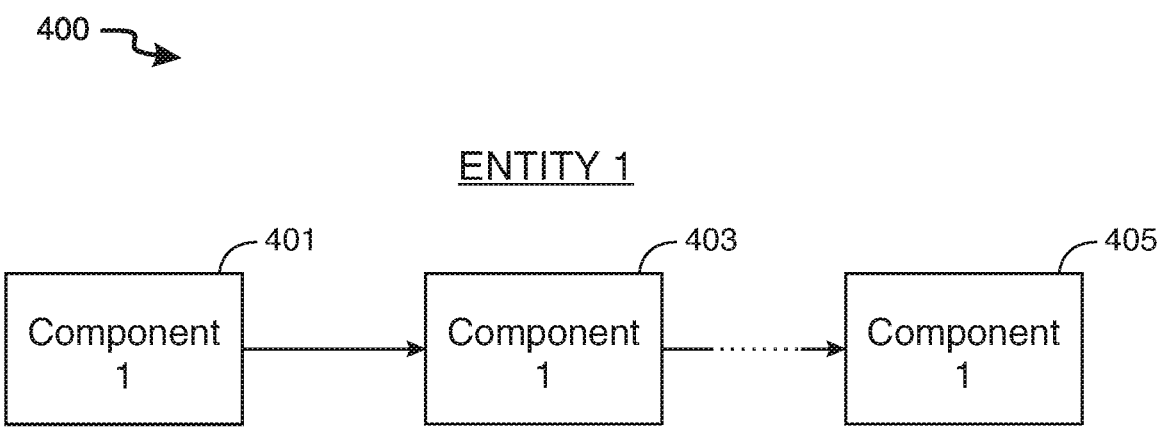
FIG. 4 shows still another illustrative system in accordance with principles of the disclosure.

FIG. 4 shows illustrative system 400. System 400 may include a smart supply chain. The smart supply chain may include Entity 1. System 400 may show a part of a multi-stage process for manufacturing an end product. The process may begin at stage 401. Stage 401 may include an improvement to Component 1. The same Component 1 may be subject to stage 403, etc., until the process culminates at stage 405 to produce the end product.

An IoT device (not shown) may, in some embodiments, be attached to Component 1 at or prior to stage 401. The IoT device may be initialized with a cost. The initial cost may be a cost of purchasing, sourcing, or fabricating Component 1. The cost stored in the IoT device may be updated at each stage to reflect a cost associated with that stage. For example, the IoT device may be initialized with a purchase cost of $100. Stage 401 may include painting Component 1. The painting may cost $10, so the IoT device may be updated to store a running cost of $110. Stage 405 may include applying a sealant to complete Component 1. The running cost may be updating by adding $15—the cost of applying the sealant—for a total real cost of $125.

In other embodiments, IoT devices may be associated with some or all the stages of the supply chain. The IoT devices may track the progress of a component through the stages of the supply chain to provide a dynamic valuation of end products.

Figure 5:
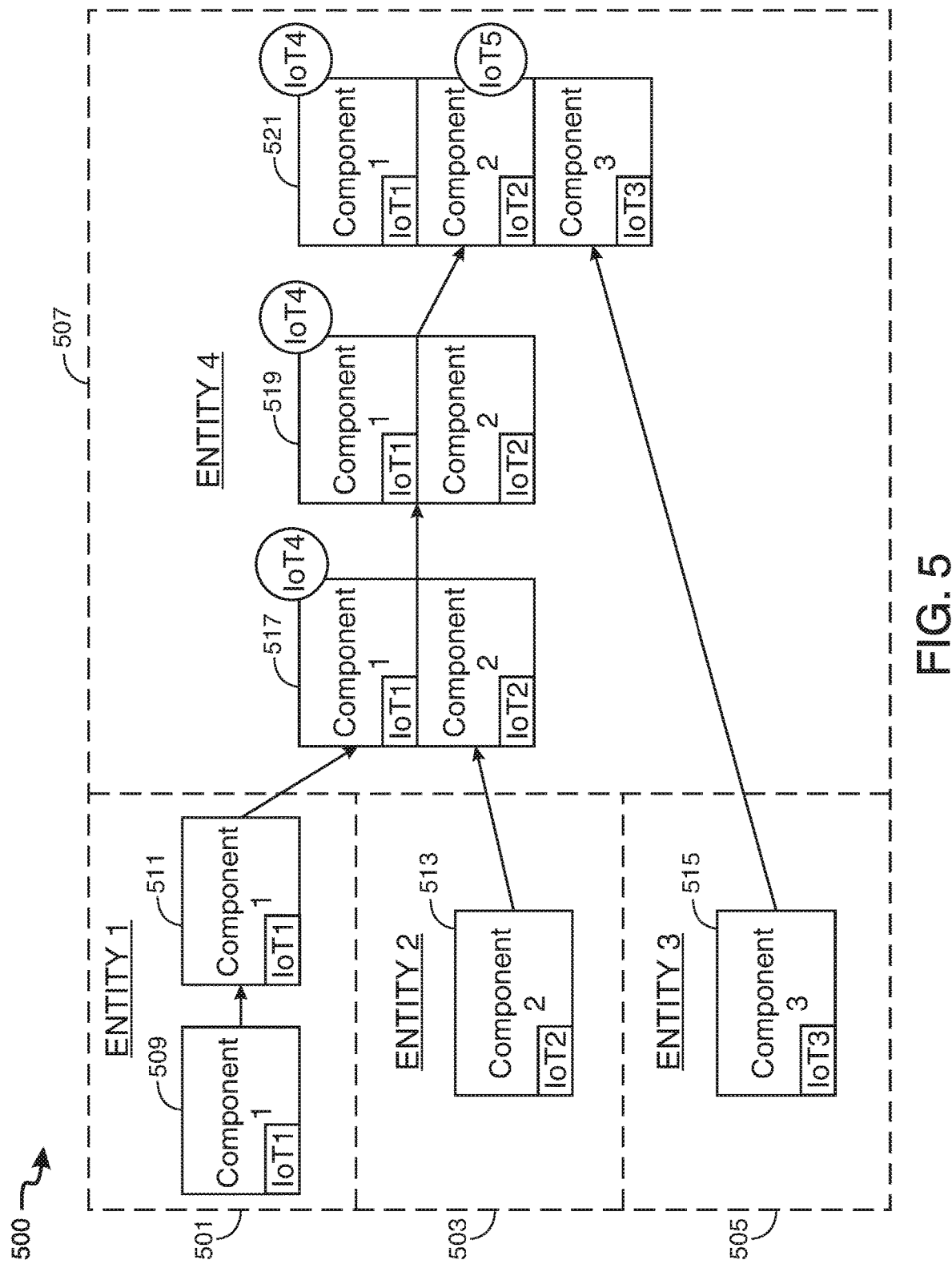
FIG. 5 shows another illustrative system in accordance with principles of the disclosure.

FIG. 5 shows illustrative system 500. System 500 may include a smart supply chain. The smart supply chain may include Entity 1, 501, Entity 2, 503, Entity 3, 505, and Entity 4, 507. An example of an entity may include a manufacturer or a supplier. The entities may, in some embodiments, be related sub-entities under a larger, umbrella, entity.

In one embodiment, Entity 4 (507) may procure Component 1 from Entity 1, Component 2 from Entity 2 (503), and Component 3 from Entity 3 (505). Each of Entities 1-3 (501-505) may have procured its respective component via sourcing, fabricating, purchasing, or any other suitable means for procuring a component. The procuring may be a one step process, or, alternatively, a multi-step process. A multi-step process may be shown at Entity 1 (501) where Component 1 progresses from step 509 to 511.

Entity 4 may manufacture an end product 521 from Components 1-3. Manufacturing end product 521 may first include merging Components 1 and 2 at step 517. Step 519 may further process the merged component. At step 521, the merged component may be further merged with Component 3 to form the end product.

In some embodiments of the system, the smart supply chain may include a plurality of IoT devices. The IoT devices may be attached to, or otherwise associated with, Components 1-3 and the end product.

For example, a first IoT device IoT1 may be attached to Component 1. IoT1 may be initialized with a first cost, $C_1$. $C_1$ may be the cost of procuring Component 1. $C_1$ of IoT1 may be updated at step 511 to store Cr. A second IoT device, IoT2, may be attached to Component 2. IoT2 may be initialized with a second cost, $C_2$. $C_2$ may be the cost of procuring Component 2. A third IoT device, IoT3, may be attached to Component 3. IoT3 may be initialized with a third cost, $C_3$. $C_3$ may be the cost of procuring Component 3.

Entity 4 (507) may merge Components 1 and 2 at step 517. A fourth IoT device, IoT4, may be attached to the merged component. IoT4 may be initialized with a cumulative cost, $C_{c1}$, that includes a sum of $C_1$, $C_2$, and a cost of the merge, $C_{m1}$. Entity 4 may further process the merged component at step 519. IoT4 may be updated with a cost that includes a cost of the further processing, to yield $C_{c1'}$. At step 521, Entity 4 may further merge the merged component with Component 3 to form the end product. A fifth IoT device, IoT5, may be attached that stores a final cost, $C_f$. $C_f$ may include a sum of $C_{c1'}$, $C_3$, and a cost of the final merge.

In some embodiments, the IoT devices may communicate among each other directly to compute the running costs. In some embodiments, the first, second, third, and fourth IoT devices may be deactivated after transmitting the cost data to the more cumulative IoT devices, in effect being subsumed by the more cumulative IoT devices.

In certain embodiments, the IoT devices may be configured to be repaired and/or adjusted based on real-time conditions. This feature may allow for autonomous operations and recovery. Furthermore, the IoT devices may be configured to detect quality from a previous device to understand and detect failure rates. For example, IoT3 may sense an increasing error rate from IoT2. This may indicate an upstream error, e.g., from IoT1, or that IoT2 may be compromised.

Figure 6:
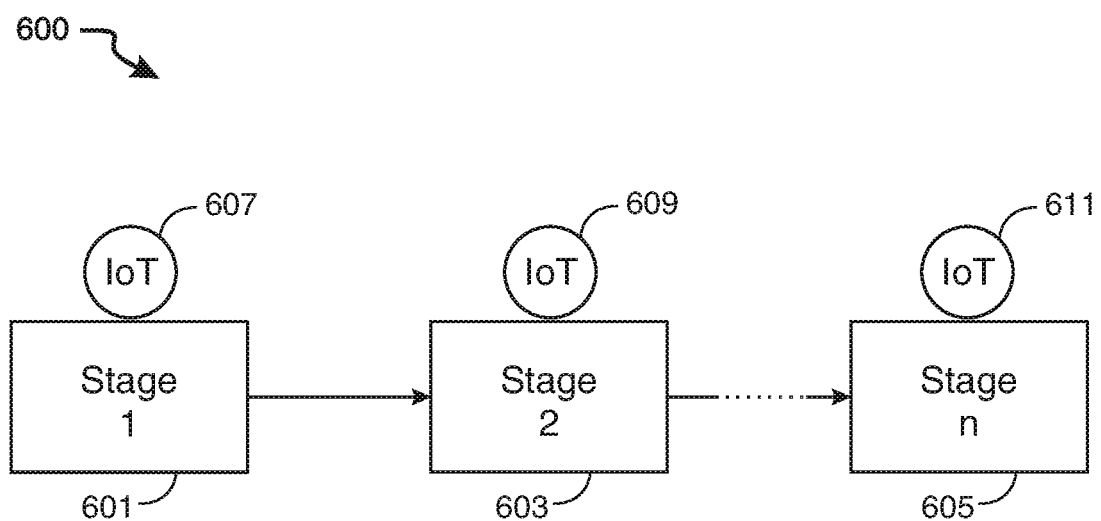
FIG. 6 shows yet another illustrative system in accordance with principles of the disclosure.

FIG. 6 shows illustrative system 600. System 600 may include a smart supply chain. The smart supply chain may, in an exemplary embodiment, include Stage 1, 601, Stage 2, 603, etc., until Stage n, 605. Any number of stages may exist between Stage 2 and Stage n. Stages 601-605 may be part of a multi-stage process for manufacturing an end product.

Stages 601-605 may each be associated with an IoT device, 607-611. IoT devices 607-611 may include sensors for deriving a cost associated with a stage. For example, an IoT device at a stage may include a camera connected to a processor. The IoT device may measure that 10 gallons of white paint were used to paint a component. The IoT device may have access to a database that contains a price per gallon of white paint. Thus, the IoT device may compute a cost for the stage. If, for example, 2 gallons of paint spill on the floor, thereby necessitating 12 gallons for the painting of a particular component, the IoT device will adjust the cost of the stage for that particular component accordingly.

In certain embodiments, IoT devices 607-611 may include IoT readers. The IoT readers may scan passing components and receive data stored on the components. For example, the components may include RFID tags attached to them. The RFID tags may store cost information. The IoT readers may read the cost information from the RFID tags.

IoT devices 607-611 may transmit the computed costs to a database. In some embodiments, the database may be a server, or a central database of an entity. In other embodiments, the database may be a distributed ledger, or a blockchain database.

Figure 7:
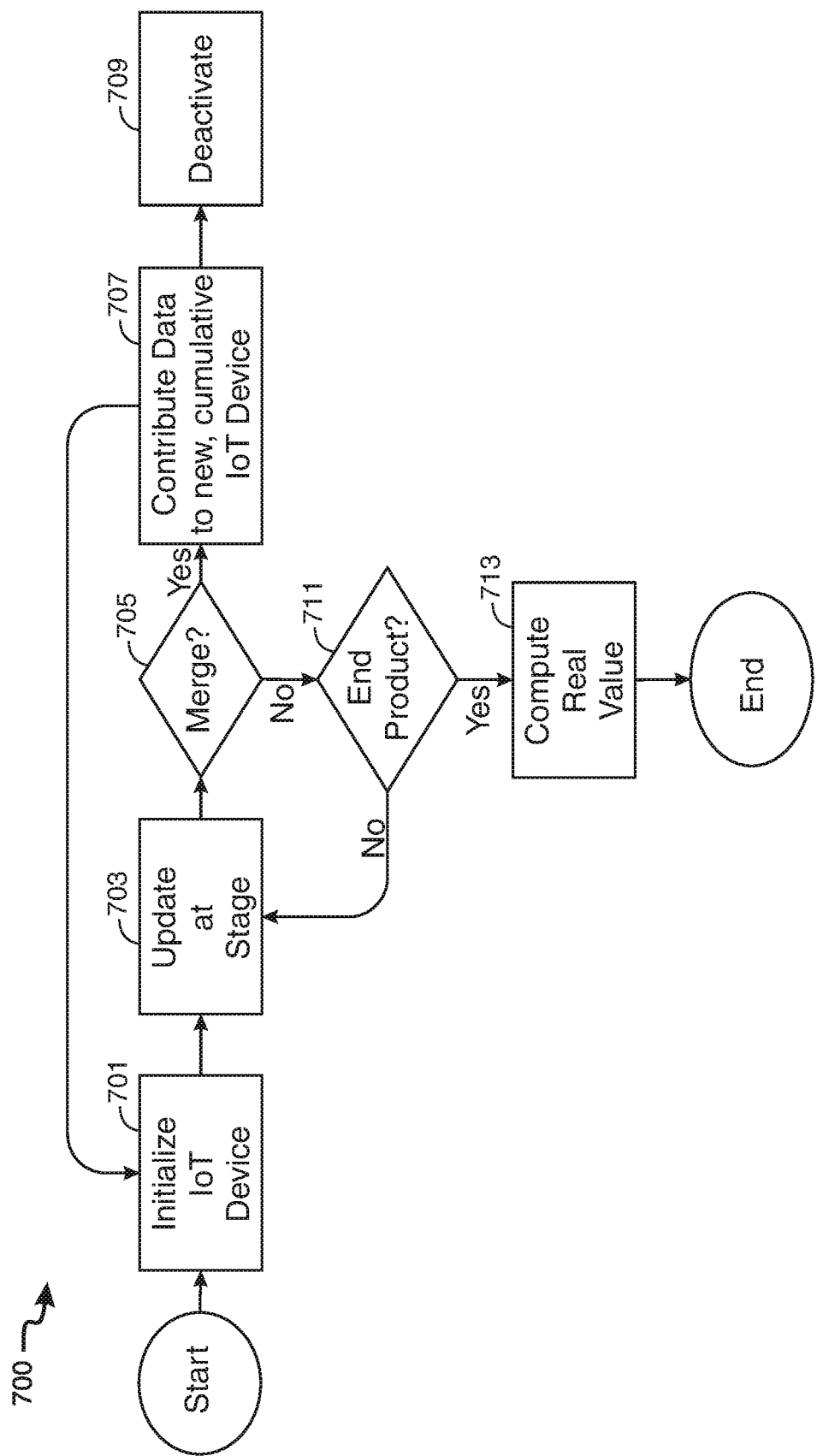
FIG. 7 shows an illustrative flowchart in accordance with principles of the disclosure.

FIG. 7 shows illustrative flowchart 700. Flowchart 700 may show an exemplary process for an IoT device-based, dynamic supply chain valuation system.

Flowchart 700 begins with step 701. At step 701, an IoT device connected to a component is initialized with a value. The value may be a running cost or a quality/safety rating of the component. At a stage of a multi-stage supply chain, the value in the IoT device may be updated, at step 703, to reflect a change in the value that occurred at the stage. Step 705 queries whether the component is merged with another component to form a merged component. If it is merged, then at step 707 the IoT device contributes its data (i.e., the value) to a cumulative IoT device that is attached to the merged component. Contributing data may include transmitting the data directly to the other IoT device. The IoT device may be deactivated at step 709. Since the cumulative IoT device is a new IoT device attached to a new, merged, component, the process for the cumulative IoT device may recursively feed back into step 701, initializing. Initializing the cumulative IoT device may include receiving the data contributed by the IoT devices at step 707.

If the component at step 705 is not merged, the process queries whether the stage is the final stage, and therefore the component is now the end product. If not, the process loops back to step 703 for the next stage. If yes, the real, final value is computed at step 713, and the process is complete. Thus, the process runs a recursive algorithm which computes a cumulative result for an end product based on narrower computations executed by IoT devices connected to smaller sub-components.

Figure 8:
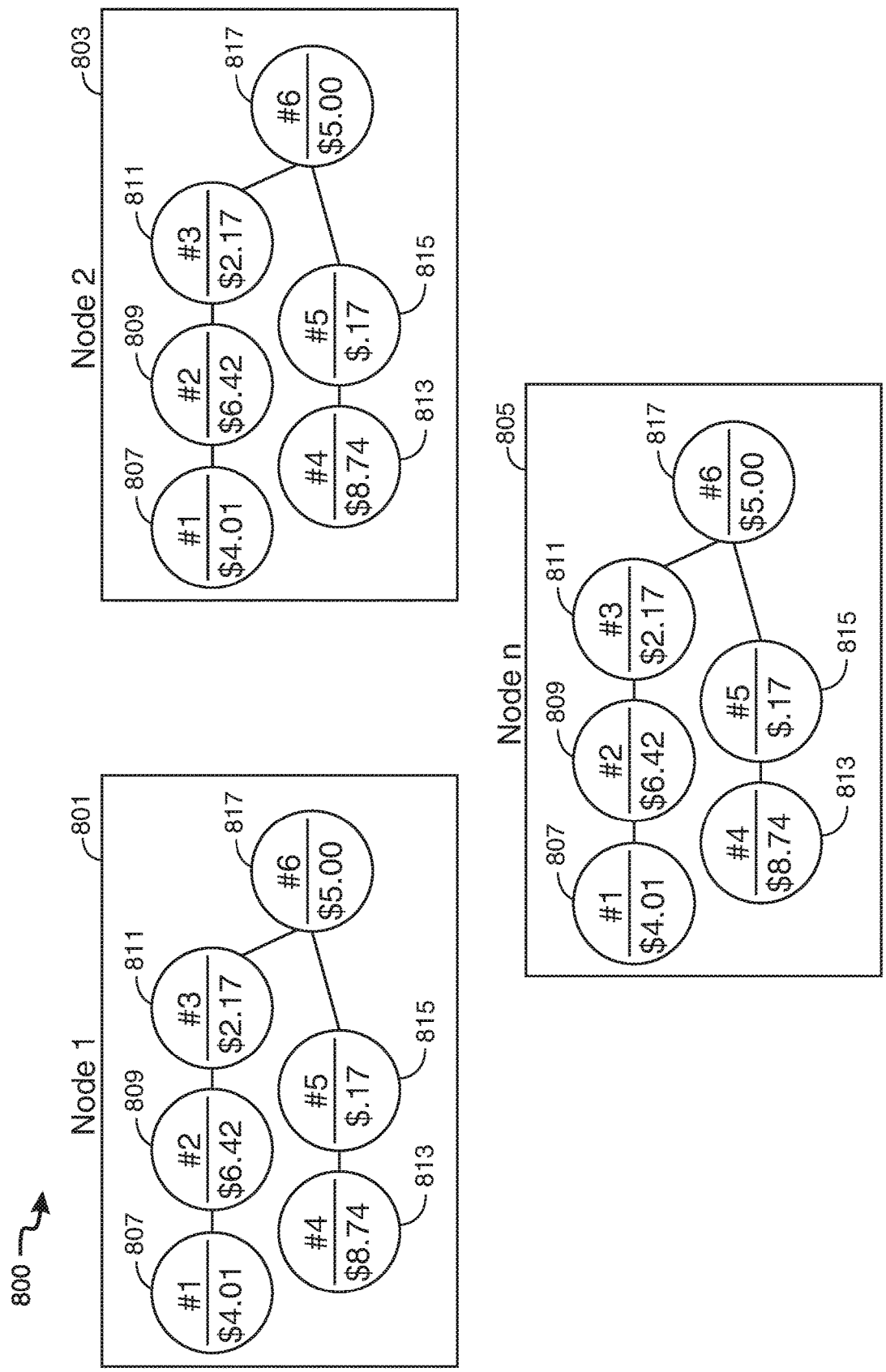
FIG. 8 shows an illustrative system in accordance with principles of the disclosure.

FIG. 8 shows illustrative system 800. System 800 shows an exemplary blockchain database for use in conjunction with a smart supply chain.

System 800 may include a plurality of nodes. The nodes may include Node 1 (801), Node 2 (803), etc., through Node n (805). Each of nodes 801-805 may store a copy of a tree-like data structure. Each of nodes 801-805 may independently receive data to store in its data structure. The nodes may compare their data structures among each other and coordinate—i.e., sync—the data structures based on a consensus or a quorum.

The data structure hosted by nodes 801-805 may include blocks 807-817. Blocks 807-817 may include data associated with a multi-stage supply chain process for a particular end product. Each block may, in this simple example, store a stage ID number and a cost. (In this illustrative example, the cost is the cost for each stage individually. In other embodiments, the cost may be a running cost, i.e., a summation of the costs of the current and previous stages.) Block 807 may store #1 for stage ID number, and $4.01 for a cost of the stage. Stage 1 may include purchasing a sub-component, and the purchase price in this particular instance may have been $4.01. Blocks 809 and 811 may represent that stages number 2 and 3, respectively, cost $6.42 and $2.17.

Blocks 813 and 815 may represent that stages number 4 and 5, respectively, cost $8.74 and $0.17. Stages 4 and 5 may represent a process with a different sub-component than the sub-component of stages 1-3. Block 817 may represent stage 6, at which the two sub-components may be merged, with an associated cost of $5.00. A total cost may be computed for the end product by summing the cost in each block. In this example, the total cost for the end product is $26.51.

In some embodiments, the blocks may be linked in a linear fashion. For example, when the sub-components are merged at stage 6, blocks 813 and 815 may be appended after block 811, and block 817 may be appended after block 815. In some embodiments, the data in blocks 807-817 may be hashed and/or encrypted.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for blockchain augmented internet of things ("IoT") device-based systems for dynamic supply chain tracking are provided. Persons skilled in the art will appreciate that the present invention can be practiced by other than the described embodiments, which are presented for purposes of illustration rather than of limitation, and that the present invention is limited only by the claims that follow.

What is claimed is:

1. A smart supply chain ("SSC"), the SSC comprising:
   a plurality of stages, each stage configured to execute one step of a multi-step process for producing an end product from one or more sub-products;
   a plurality of Internet of Things ("IoT") devices, at least one of the IoT devices that is associated with a stage and at least one of the IoT devices that is coupled to a product, said product being either the end product or one of the sub-products; and
   a blockchain database, said blockchain database comprising a plurality of coordinated databases, wherein each coordinated database is stored on a distinct node of a plurality of nodes, and each coordinated database comprises linked blocks of hashed data, wherein a block that is linked to a previous block includes a hashing of the hashed data of the previous block;
   wherein:
   the IoT devices compute a record for each step of the multi-step process, said record comprising data that includes a step identifier ("ID") and a calculation of a value impact of the step;
   the data is added to the blockchain database; and
   the end product is associated with a real value that is based on the data in the blockchain database.

2. The SSC of claim 1, wherein the value impact of a step includes:
   a sum of the values of a plurality of sub-products that are merged at the step;
   an increase in value due to an improvement executed on a product at the step; and
   a decrease in value due to an occurrence at the step.

3. The SSC of claim 1, wherein, when an IoT device computes a record for a step, the IoT device adds the data of the record to the blockchain database by transmitting the data to the plurality of nodes, and each node hashes the data and stores the hashed data as a new linked block.

4. The SSC of claim 1, wherein each one of the IoT devices is a node.

5. The SSC of claim 1, wherein the nodes comprise computer systems of one or more preauthorized entities of the following list of entities:
   suppliers;
   manufacturers;
   distributers;
   retailers; and
   regulatory agencies.

6. A system for dynamic valuation of a unit, said unit that is manufactured via a multi-stage supply chain process, and said unit that comprises one or more subunits, at least one of the subunits being a foundational subunit, the system comprising one or more Internet of Things ("IoT") devices, wherein:
   each of the subunits and the unit are coupled to a distinct IoT device of the IoT devices;
   each IoT device comprises a non-transitory computer memory for storing a registry of data relating to a cost and a quality of the unit or subunit to which said IoT device is coupled;
   the registry of the IoT device that is coupled to a foundational subunit is initialized with a running cost and a quality rating for said foundational subunit;
   when a subunit is processed at a stage of the multi-stage supply chain process, the registry of the IoT device coupled to said subunit is updated to reflect a change, caused by the processing at the stage, in the running cost and the quality rating for said subunit;

when two or more subunits are merged into a merged component, at a stage of the multi-stage supply chain process:

the registry of the IoT device coupled to the merged component is updated with a running cost and quality rating that are based at least in part on a combination of the running costs and the quality ratings of the two or more subunits; and the IoT devices coupled to the two or more subunits are deactivated; and when the supply chain process is complete, the registry of the IoT device coupled to the unit is updated with the running cost and the quality rating that are based on a predetermined function of all the running costs and the quality ratings of every subcomponent and stage of processing that were included in the multi-stage supply chain process;

wherein the system further comprises:

a distributed ledger for data management, said distributed ledger comprising a set of databases, each of said databases comprising a set of linked data blocks, each data block comprising hashed data, wherein a data block that is linked to a previous data block includes a hashing of hashed data of the previous data block, and each one of said databases is stored on a distinct one of a plurality of nodes, wherein:

when a running cost and quality rating of an IoT device are initialized, a data block containing data associated with the initialization is created on each of the nodes; and when a running cost and quality rating of an IoT device are updated, a data block containing data of the update is created on each of the nodes, and said data block is linked to the most recent pre-update data block.

7. The system of claim 6, wherein each of the IoT devices comprises a radio frequency identifier ("RFID") tag, and each of the IoT devices is configured to adhere to the unit or one of the subunits.

8. The system of claim 6, each IoT device further comprising a receiver for receiving data and a transmitter for transmitting data, wherein the IoT devices are configured to transmit and receive with one or more of the following communication protocols:

Bluetooth;
IEEE 802.11 standard ("Wi-Fi");
Light Fidelity ("Li-Fi");
IEEE 802.15.4 standard ("ZigBee"); and
cellular.

9. The system of claim 6, wherein:

the initialized running cost for a foundational subunit is based on a cost of obtaining the foundational subunit, said obtaining comprising purchasing, sourcing, or creating; and the initialized quality rating for a foundational subunit is based on a predetermined mapping of quality ratings to a list of possible sources of a foundational subunit.

10. The system of claim 6, wherein:

the updating the running cost when two or more subunits are merged comprises summing the running costs of the two or more subunits, and adding to the sum a cost of the merging; and the updating the quality rating when two or more subunits are merged comprises taking the minimum of the quality ratings of the two or more subunits.

11. The system of claim 6, wherein the deactivating of the IoT devices of the two or more subunits comprises setting a deactivated flag for each of said IoT devices.

12. The system of claim 6, wherein the IoT devices are configured to communicate with each other, and the updating the running cost and the quality rating when two or more subunits are merged into a merged component at a stage of the multi-stage supply chain process comprises a sub-process wherein the IoT device that is coupled to the merged component communicates with the IoT devices of the two or more subunits to receive the data stored in the IoT devices of the two or more subunits.

13. The system of claim 6, wherein:

the updating the running cost when a subunit is processed at a stage comprises receiving cost data from one or more sensors located proximal to the stage, said cost data including a real-time cost associated with the stage, and the cost data is added to the running cost; and the updating the quality rating when a subunit is processed at a stage comprises receiving quality data from one or more sensors located proximal to the stage, said quality data including a real-time quality impact associated with the stage, and the quality data is added to the quality rating.

14. The system of claim 6, wherein, when a running cost and quality rating of an IoT device are initialized or updated, and a data block is created on each of the nodes, said IoT device transmits a signal to the nodes to trigger the creation of the data block.

15. The system of claim 6, further comprising a network of hub devices, each hub device positioned proximal to a stage of the multi-stage supply chain process, and each hub device comprising an IoT reader, wherein, when an IoT device is updated at the stage, the hub device reads the data of the update from the IoT device, and transmits the data of the update to the nodes for creating a new data block.

16. The system of claim 6, wherein the nodes comprise the IoT devices.

17. The system of claim 6, wherein the nodes comprise computer systems of one or more preauthorized entities of the following list of entities:

suppliers;
manufacturers;
distributers;
retailers; and
regulatory agencies.

18. A method for dynamic supply chain product valuation, the method comprising:

embedding each of a plurality of Internet of Things ("IoT") devices across a multi-stage supply chain that is configured for producing an end product from one or more sub-products, wherein said embedding comprises associating an IoT device with a stage or coupling an IoT device to a product, said product being either the end product or one of the sub-products;

computing, via the plurality of IoT devices, a value impact of each stage of the multi-stage supply chain process, wherein computing the value impact of a stage comprises computing a change, caused by processing at the stage, in a running cost and a quality rating for said product;

transmitting, via the plurality of IoT devices, each value impact of a stage to a plurality of blockchain database host systems;

constructing, via each of the plurality of blockchain database host systems, a new linked data block for each value impact of a stage; and computing a real value of the end product based on the linked data blocks in the plurality of blockchain database host systems.

19. The method of claim 18, wherein the plurality of blockchain database host systems comprise the IoT devices and computer systems of one or more preauthorized entities of the following list of entities:

suppliers;
manufacturers;
distributers;
retailers; and
regulatory agencies.

* * * * *